United States Patent
Immel

Patent Number: 5,435,084
Date of Patent: Jul. 25, 1995

[54] APPARATUS AND METHOD FOR ATTACHING A DIGGING TOOTH TIP

[75] Inventor: Darryl R. Immel, Waterford, Wis.

[73] Assignee: Harnischfeger Corporation, Milwaukee, Wis.

[21] Appl. No.: 197,821

[22] Filed: Feb. 17, 1994

[51] Int. Cl.⁶ .............................................. E02F 9/28
[52] U.S. Cl. .................................. 37/398; 37/452; 37/457; 172/713; 172/772; 403/320; 411/941.1
[58] Field of Search ................. 37/446, 452, 453, 454, 37/455, 456, 457, 458, 459; 172/701.3, 713, 719, 772, 772.5; 403/105, 107, 108, 320, 380, 409.1; 411/7, 349, 354, 941.1

[56] References Cited

U.S. PATENT DOCUMENTS

| | | | |
|---|---|---|---|
| 1,963,847 | 6/1934 | Jersey | 37/446 |
| 3,722,932 | 3/1973 | Dougall | 37/457 X |
| 4,056,893 | 11/1977 | Willard | 37/455 |
| 4,120,105 | 10/1978 | Stepe | 37/142 R |
| 4,136,469 | 1/1979 | Zepf | 37/141 T |
| 4,238,896 | 12/1980 | Lanz et al. | 37/141 R |
| 4,329,794 | 5/1982 | Rogers | 37/115 |
| 4,414,764 | 11/1983 | Johansson et al. | 37/141 T |
| 4,449,309 | 5/1984 | Hemphill | 37/141 R |
| 4,481,728 | 11/1984 | Mulder et al. | 37/452 |
| 4,704,812 | 11/1987 | Paramore, Jr. | 37/141 R |
| 4,782,607 | 11/1988 | Frisbee et al. | 37/141 R |
| 4,918,843 | 4/1990 | Kiesewetter et al. | 37/457 |
| 4,932,145 | 6/1990 | Reeves, Jr. | 37/141 T |
| 5,068,986 | 12/1991 | Jones | 37/446 X |
| 5,205,057 | 4/1993 | Garman | 37/452 X |
| 5,311,681 | 5/1994 | Ruvang et al. | 37/452 X |

FOREIGN PATENT DOCUMENTS

750153  7/1980  U.S.S.R. ............................. 403/320

*Primary Examiner*—Randolph A. Reese
*Assistant Examiner*—Andrea Chop
*Attorney, Agent, or Firm*—Jansson & Shupe, Ltd.

[57] ABSTRACT

A digging tooth assembly has a base nose, a replaceable tooth tip mounted on the base nose and a pin securing the tip to the nose. The pin includes a locking head eccentric to the pin and a pad-like resilient member is placed between the head and the tooth tip. The locking head is rotated so that the resilient member is compressed to urge the tooth tip in a direction such that the tip is maintained in a nose-contacting position.

17 Claims, 5 Drawing Sheets

APPARATUS AND METHOD FOR ATTACHING A DIGGING TOOTH TIP

FIELD OF THE INVENTION

This invention is related to digging and excavating equipment and, more particularly, to aspects of the digging buckets of such equipment.

BACKGROUND OF THE INVENTION

Certain types of earth-moving and excavating machinery are equipped with digging buckets (having digging teeth facing toward the machine) or dippers (having teeth facing away from the machine) capable of holding anywhere from a fraction of a cubic yard to several cubic yards of material. As used in this specification, the term "bucket" is a general term referring to a bucket, a dipper or to any other type of scoop-like device attached to a machine for digging.

One type of digging machine is called a dragline and uses a large, cable-suspended digging bucket. Such draglines are often used in strip mining to remove "overburden" material covering, e.g., coal or ore, and to remove the product being mined. A dragline may be crawler mounted and very large draglines are often configured as what is known as a "walking" dragline, so named because of the leg and foot-like mechanisms used to move it short distances.

Digging is by lowering the bucket onto the material to be removed and dragging the bucket toward the machine. As the bucket is drawn toward the machine, its digging teeth bite into the material and the bucket fills. After the bucket is filled, the boom is swung laterally and the bucket tipped for dumping the load.

Other types of digging machines such as front end loaders, back hoes, hydraulic excavators, mining shovels and the like are also equipped with digging buckets and sometimes such buckets are of very substantial capacity. Unlike the bucket of a dragline, the bucket of a front end loader is attached to and manipulated by two or three rigid arm-like members which are manipulated by hydraulic cylinders.

A large bucket, particularly a dragline bucket, often has a bucket lip to which is attached various components to protect the lip and to dig. More specifically, such a bucket has several tooth assemblies mounted in spaced-apart relationship along the lip. Lip shrouds are positioned between the tooth assemblies to protect the lip. The reason for the shrouds is that the lip is a very expensive equipment component to replace (especially in larger buckets) and the shrouds and components of the tooth assemblies are considered as expendable replacement parts.

To give some idea of size, the tip of a digging tooth for a large bucket may have a length of 13 inches or so (as measured in the direction of digging), a width of about 12 inches and weigh about 160 pounds. And a large bucket itself may weight several thousand pounds. The lip shrouds are correspondingly large.

More specifically, each hollow, sheath-like tip is fitted over and supported by a tooth "nose" or base. The tip (which is generally hollow to receive the base) has a pair of apertures, one each in the top and bottom tip plate. The base has a single vertical aperture. When the tip is fully seated on the base and in tip-supporting contact therewith, the apertures are aligned and form a single vertical "top-to-bottom" aperture.

Conventional digging tooth assemblies are retained on the lip (or, in the case of a tooth assembly, on a base piece) by a wedge pin alone or by a wedge-shaped member used with a wedge pin. Such member is sized so that when in place, a small aperture remains.

A wedge-shaped pin is driven (often with a sledge hammer) into such aperture and retains the shroud or the tip in place solely by friction. Such arrangement is configured in anticipation of periodic tip and/or wedge pin replacement. Examples of digging buckets and ways to retain components thereon are shown in U.S. Pat. Nos. 4,414,764 (Johansson et al.), 4,782,607 (Frisbee et al.), 4,136,469 (Zepf) and others.

Another approach to retention of tooth parts involves a cylindrical lock pin with a retaining ring (which resembles a snap ring) surrounding the pin. The apertures through which such pins are inserted are often formed by casting the part (e.g., a tooth tip) rather than by machining such apertures. As is known, casting "tolerances" are much more liberal than machining tolerances.

The conventional wedge pin arrangement is attended by a number of disadvantages. One is that, over time, the wedge pins are knocked out or they can simply become loose and fall out. The retained piece, e.g., a tooth tip, then falls off and is likely to be lost. Not only are these parts expensive to replace, their entry into auxiliary equipment, e.g., crushers, can badly damage such equipment. Another disadvantage is that the wedge pin is usually hardened and hammering such pin may cause it to splinter, sending shards of metal flying like shrapnel.

Yet another disadvantage is that the hardened wedge pin lacks significant resilience or ductility and, with slight wear, this fact promotes pin loosening. In other words, the parts are not self-adjusting to any significant degree.

Even if the wedge pin remains secure over the life of the tip, pin removal preparatory to replacement of the tooth tip is a substantial task. Because such pins are driven from the top downward, they must be removed by driving them upward using a hammer and drift pin which may not be readily available.

And to knock out the wedge pin, access to the underside of the bucket is required—a bucket weighing several thousand pounds presents an imposing "positioning task." If the digging edge of the bucket is merely lifted away from the ground (rather than totally inverting the bucket), an individual is required to work beneath the lifted bucket and this presents unnecessary risks.

Some wedge pin arrangements involve an aperture extending horizontally across the width of the tooth tip and tooth base. In theory, wedge pins should then be removable without gaining access to the bottom of the bucket. However, there is sometimes too little space between tooth assemblies to permit either satisfactory wedge pin driving or later pin removal.

A disadvantage of the cylindrical pin arrangement is that, because of aperture tolerances, the cylindrical pin may not result in a tight, wedged fit. As a consequence, there will be some "play" between parts, e.g., between the pin and the base nose. This results in wear which, with the advent of the invention, is unnecessary.

Reduction in downtime of a digging machine—as by addressing some of the disadvantages noted above—is not a trivial matter. Depending upon machine size and other factors, downtime may cost the machine owner hundreds if not thousands of dollars per hour in overhead costs.

An improved device for retaining a digging component such as a tooth tip which avoids drive pins, which eliminates a need for clear access to the bottom of the bucket and which retains the member by means other than merely friction would be an important advance in the art.

OBJECTS OF THE INVENTION

It is an object of this invention to provide an improved apparatus for attaching a digging tooth which overcomes some of the problems and shortcomings of the prior art.

Another object of this invention is to provide an improved apparatus for attaching a digging tooth which avoids driving wedge pins.

Another object of this invention is to provide an improved apparatus for attaching a digging tooth which eliminates a need for complete access to the bottom of the bucket.

Yet another object of this invention is to provide an improved apparatus for attaching a digging tooth which retains such tooth by means other than merely friction.

Another object of this invention is to provide an improved apparatus for attaching a digging tooth which permits removal of the member by accessing primarily the top of the bucket.

Another object of this invention is to provide an improved apparatus for attaching a digging tooth which utilizes readily-available tools.

Still another object of this invention is to provide an improved apparatus for attaching a digging tooth which provides a degree of "self-adjustment."

Yet another object of this invention is to provide an improved apparatus for attaching a digging tooth which avoids loose-fit "play" between parts.

Another object of this invention is to provide an improved method for securing a tooth component to a bucket.

How these and other objects are accomplished will become apparent from the following descriptions and the drawing.

SUMMARY OF THE INVENTION

The invention relates to a digging tooth assembly having a base nose and a replaceable tooth tip mounted on the base nose in a manner such that the nose extends into a conformably-shaped cavity in the tip. The nose has a hole through it, the tip has an opening through it and when the tip is properly positioned on the nose, the opening is generally in registry with the hole. A pin extends through the hole and the opening and secures the tip to the nose. Such digging tooth assemblies are used in large earthmoving equipment, e.g., dragline buckets and the like, and facilitate replacement of the tips when they become worn or broken.

In the improvement, the pin includes a locking head eccentric to the pin. A pad-like resilient member is placed between the head and the tooth tip and the locking head is rotated so that the resilient member is compressed. This urges the tooth tip in a direction such that the tip is maintained in a nose-contacting position.

More specifically, both the body portion of the pin and its locking head are round in cross-sectional shape. But the locking head has a diameter somewhat less than that of the pin body portion. The pin has a pin axis, the locking head has a head axis and the pin axis and the head axis are offset from one another and generally parallel to one another.

The locking head is rotatable between a first position (that position assumed by the head when the pin is first assembled to the tooth tip) and a second position assumed by the head when such head is in its tip-retaining position. The resilient member is compressed and the tip is retained in nose contact when the head is in such second position.

In a preferred embodiment, the assembly also includes a rigid lock block between the head and the tooth tip and the resilient member is compressed between such lock block and tooth tip. The eccentric locking head includes at least one retention ridge engaging the lock block when the pin is in the second position. This helps prevent the locking head from working its way back toward the first position.

In a highly preferred embodiment, the locking head has plural retention ridges and the lock block has plural retention grooves. Each of at least two retention ridges engage separate retention grooves. Since, preferably, the locking head and the lock block have mutually-engaging ratchet-like serrations thereon, it is also appropriate to say that the ridges are on the lock block and the grooves are on the head.

The new digging tooth assembly also has features facilitating easy disassembly from the exposed top of the tooth (rather than from the hard-to-access bottom) or from the side of such tooth. In particular, the pin includes a body portion and a central axis and the head extends laterally away from the central axis by a first dimension. And the body portion also extends laterally away from the central axis but by a second dimension. Such second dimension is at least about equal to the first dimension.

Stated another way, the head does not protrude laterally beyond the pin body portion. For reasons that will become apparent after appreciating the detailed description, this configuration makes it easier to drive the pin out "top down" when the tooth assembly is being taken apart to replace a broken or worn tooth. So-called top down removal is an important, time-saving feature not available in all prior art tooth tip assemblies.

Other aspects of the invention relate to a method for securing the tooth tip on the base nose. The method includes, in either order, the steps of placing a resilient member adjacent to the tip and inserting the pin into the opening. Such steps are followed by the steps of moving the pin and compressing the resilient member. Preferably, the pin is moved by rotating it to the second or "lock up" position.

In a specific embodiment, the pin extends into the lock block and such block is around the locking head. The moving step includes rotating the locking head to urge the lock block toward the resilient member.

And that is not all. The invention also involves steps for readily disassembling the tooth tip from the digging tooth assembly. Such steps include driving the pin from the hole in the base nose and removing the tooth tip from the base nose. More specifically, the pin is driven in a direction out of the hole in the base nose when the pin is in its second position. That is, there is no need to first disengage the locking head and the lock block from one another before removing the pin. The ridge and groove of such head and block automatically disengage as the pin is removed.

Further details regarding the invention are set forth in the following detailed description and in the drawing.

DETAILED DESCRIPTION OF PREFERRED EMBODIMENTS

Before describing the new apparatus 10 and method, it will be helpful to appreciate how bucket digging teeth are used and how tooth tips are conventionally retained. Following these descriptions, details of the new apparatus 10 and method are set forth.

Figure 1:
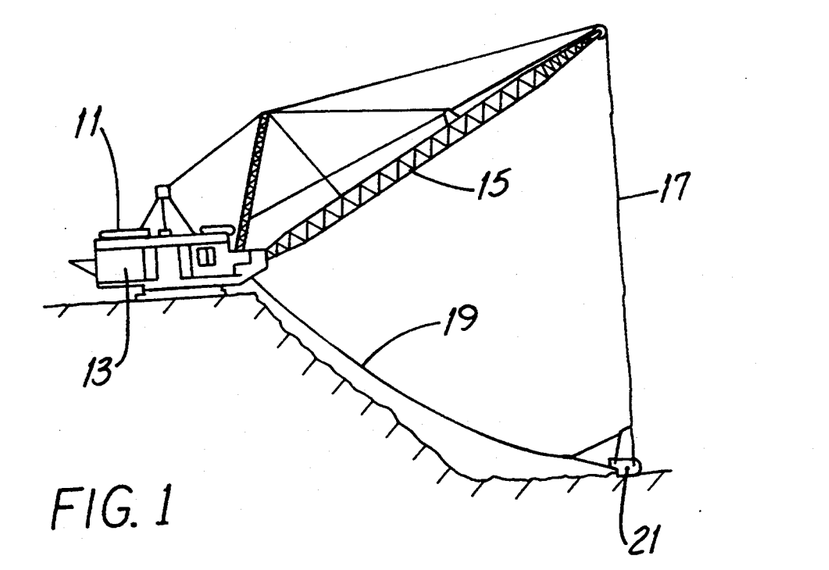
FIG. 1 is a representative side elevation view of a digging machine embodied as a dragline having a digging bucket.
Figure 2:
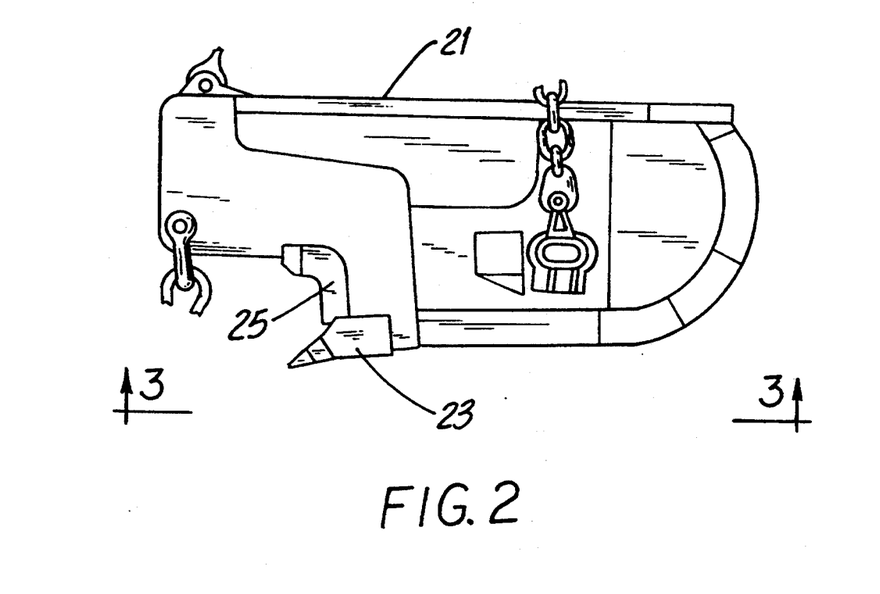
FIG. 2 is a side elevation view of the digging bucket shown in FIG. 1.
Figure 3:
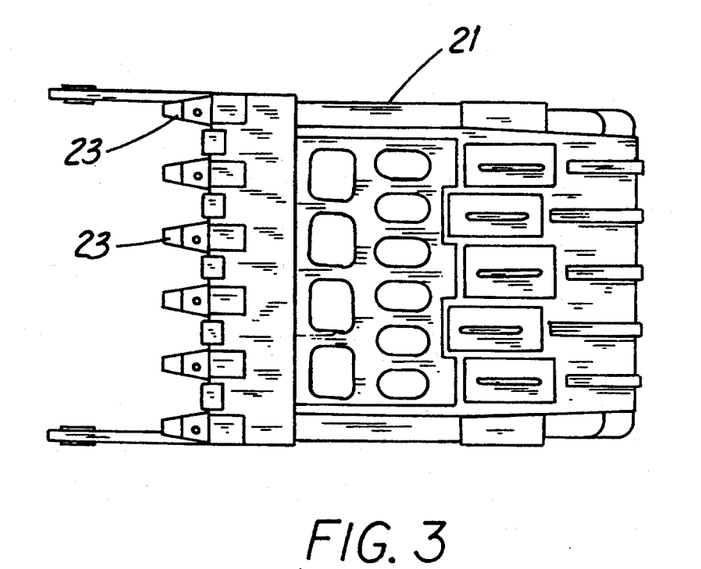
FIG. 3 is a bottom elevation view of the bucket of FIG. 2 taken along the viewing plane 3—3 thereof.

Referring to FIGS. 1, 2 and 3, the illustrated walking dragline 11 includes a machinery deck 13, an extended boom 15 and cables 17, 19 hooked to the digging bucket 21. The cable 17 raises and lowers the bucket 21 and the cable 19 draws the bucket 21 toward the dragline 11 to load material into the bucket 21. The bucket teeth 23 bite into such material which fills the bucket 21 as the bucket 21 moves. When used with the exemplary dragline 11, such teeth 23 point toward the dragline 11 during digging. The riser 25 may also be equipped with teeth 23. Of course, it should be clearly understood that buckets with replaceable tooth assemblies are used on a wide variety of digging machines; the illustrated dragline 11 is but one example of such a machine.

Figure 12:
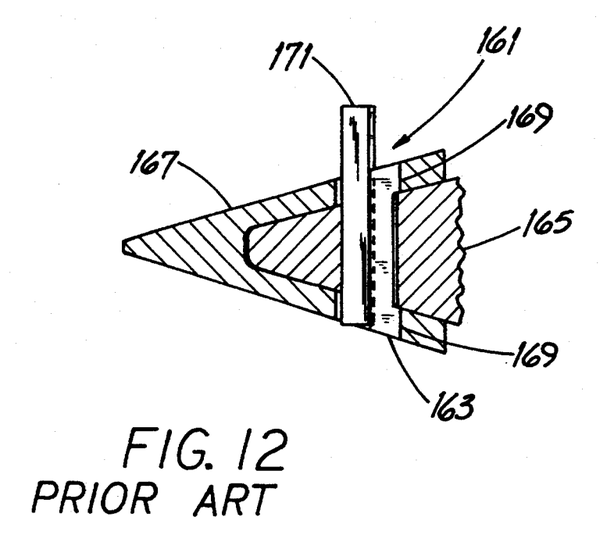
FIG. 12 is a prior art tooth tip retaining apparatus.

Referring to FIG. 12, a prior art retaining assembly 161 includes a wedge block 163 fitted into the aligned apertures of the tooth base 165 and the tooth tip 167. The block 163 is of substantially consistent thickness from top to bottom and has upper and lower protrusions 169 which overlap the base 165, help retain the block 163 in vertical position and help urge the tip 167 tightly onto the base 165 as the wedge pin 171 is driven home. The pin 171 is driven top-down into the opening between the block 163 on one side and the base 165 on the other. Retained solely by friction, the pin 171 must be driven out from the bottom with a drift pin (not shown).

Figure 4:
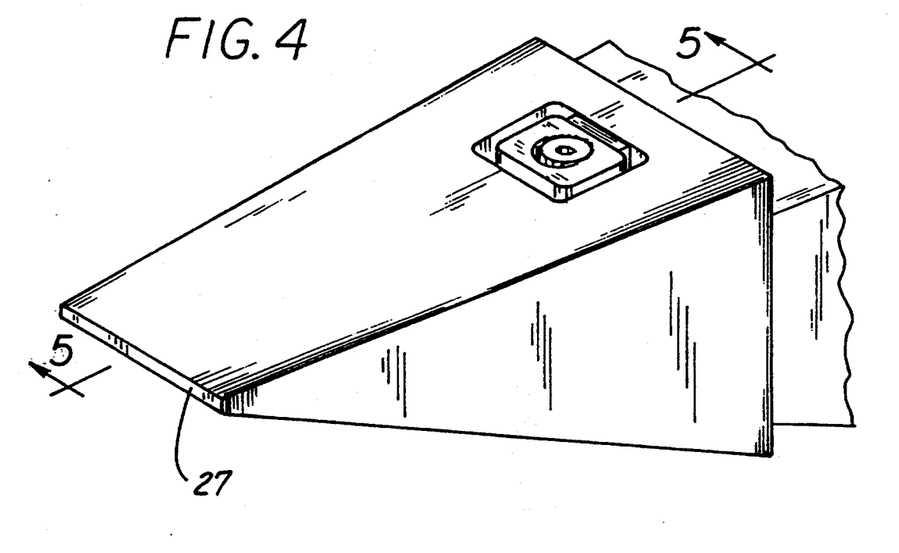
FIG. 4 is a perspective view of a bucket digging tooth assembly incorporating the inventive apparatus and including a tooth tip and a base nose upon which the tip is mounted. Parts are broken away.
Figure 5:
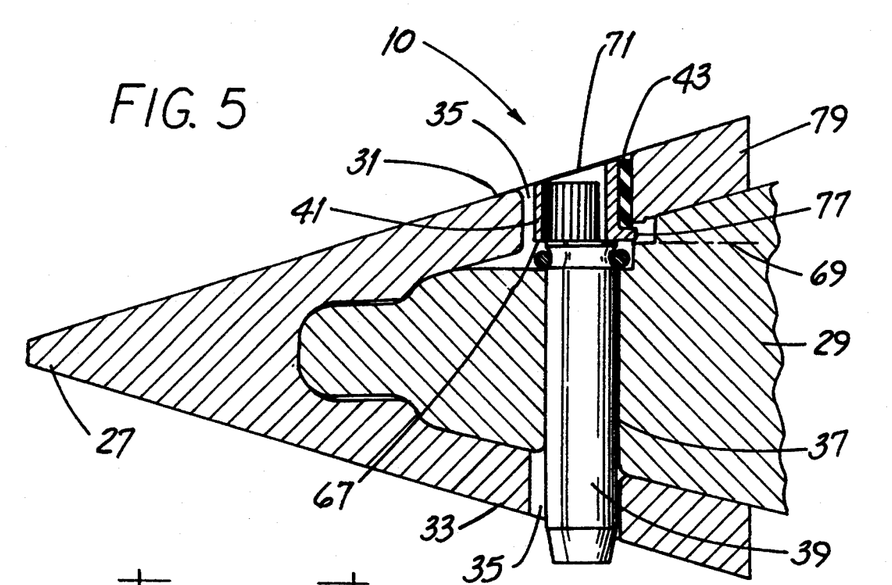
FIG. 5 is a cross-sectional side elevation view of the assembly of FIG. 4 taken along the viewing plane 5—5 thereof. Parts are broken away, a part is shown in full representation and certain surfaces are shown in dashed outline.
Figure 6:
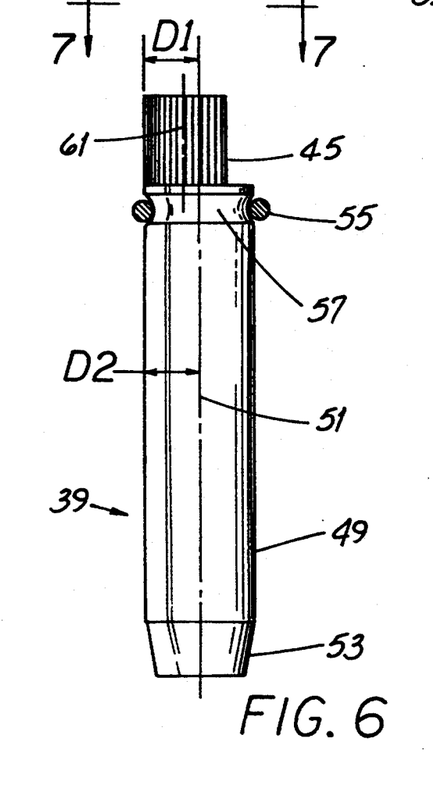
FIG. 6 is a side elevation view of the ratchet pin portion of the apparatus shown in conjunction with a lock ring. Certain surfaces are shown in dashed outline.

The new apparatus 10 and method will now be described. Referring next to FIGS. 4, 5 and 6, the apparatus 10 has a replaceable digging tooth tip 27 which is mounted sleeve-like on a base nose 29. In the illustrated arrangement, the tip 27 has top and bottom plates 31, 33, respectively, having aligned apertures 35 formed therethrough. When the tip 27 is properly seated on the base nose 29, the apertures 35 are in registry with a hole 37 in the base nose 29. The tip 27 is secured on the nose 29 by a retention apparatus 10 comprising a pin 39, a lock block 41 and a resilient member 43. The pin 39 extends into the apertures 35 and the hole 37 for tip securement.

Briefly explained, the pin 39 has an eccentric head 45 and when the pin 39 and head 45 are rotated about one-half turn after pin insertion, the head 45 urges the lock block 41 rearward (to the right in FIG. 5) which compresses the resilient member 43. Because both the head 45 and the hole 47 in the lock block 41 have vertical ratchet-like serrations, the eccentric head 45 "locks up" in a position within the lock block 41 to securely retain the tip 27. Disassembly is effected by driving the pin 39 downward.

Figure 7:
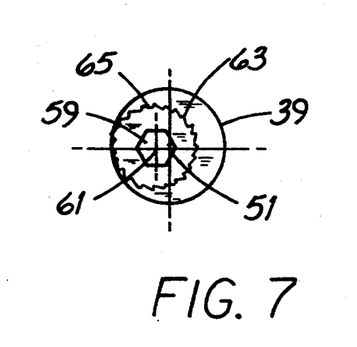
FIG. 7 is a top plan view of the pin of FIG. 6 taken along the viewing plane 7—7 thereof.

Considered in more detail and referring additionally to FIG. 7, the pin 39 has a generally cylindrical body portion 49, a central longitudinal axis 51, a lower end 53 chamfered to aid insertion and a lock ring 55 seated in a ring groove 57. The upper portion of the pin 39 includes a head 45 which is also generally cylindrical and has a pocket 59 formed in it for an Allen wrench. Of course, other types of tool-engagement devices are possible.

It is to be appreciated that there is no groove, space, notch or other "depression" between the ring groove 57 and the head 45. This arrangement is preferred so that when the pin 39 is driven downward for disassembly, the pin 39 does not "hang up" on the lock ring 55.

The head 45 also has a longitudinal head axis 61 which is offset slightly from the axis 51. This offset imparts eccentricity to the head 45 with respect to the pin body portion 49. The outer surface of the head 45 has vertically oriented retention ridges 63 and intervening grooves 65, the combination of which is not unlike gear teeth. As described below, such ridges 63 engage grooves 65a in the block 41 to lock the pin 39 in a position compressing the member 43.

Referring particularly to FIG. 6, the head 45 extends laterally away from the central axis 51 by a first dimension D1 and the body portion 49 extends laterally away from the same axis 51 by a second dimension D2 which is at least about equal to the first dimension D1. In other words, the head 45 does not protrude laterally beyond the cylindrical surface of the pin body portion 49. This dimensional relationship is preferred so that the pin head 45 does not hang up on the lock ring 55 as the pin 39 is driven downward.

It will be appreciated that there are other ways of providing an eccentric head 45 including one which does protrude laterally beyond the surface of the pin body portion 49. Likely results with such an arrangement include having to drive the pin 39 out from the bottom and/or providing some sort of clearance space in the tip 27 and/or the nose 29.

Figure 8:
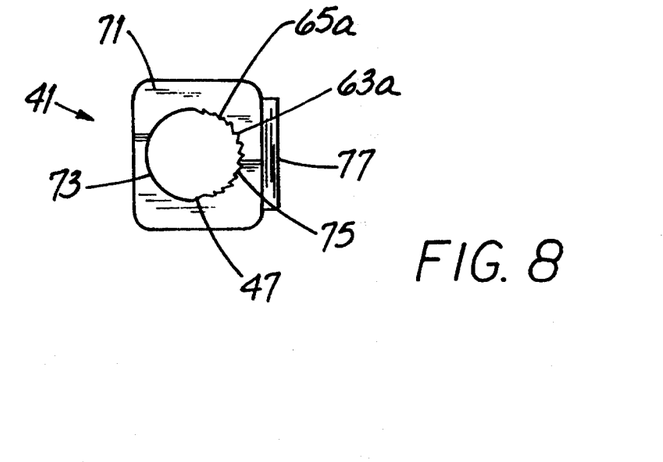
FIG. 8 is a top plan view of the lock block portion of the apparatus.

Referring now to FIGS. 5 and 8, the lock block 41 is generally cubical in shape and has a bottom rim 67 defining a plane 69 generally normal to the pin axis 51. The top rim 71 is angled to generally conform to the outer shape of the tip 27. A hole 47 extends through the block 41 and is configured with first and second lobes 73 and 75, respectively. In general, each lobe 73, 75 is in the shape of a half-cylinder when viewed along the vertical depth of the block 41.

The first lobe 73 has a smooth interior surface and a slightly greater radius of curvature than the second lobe 75. This permits easy pin insertion with the head 45 toward the first lobe 73. Like the exterior surface of the head 45, the interior surface of the second lobe 75 has retention ridges 63a and intervening grooves 65a. When the tip 27 is secured by the apparatus 10, the block ridges 63a and grooves 65a engage grooves 65 and ridges 63, respectively, of the head 45. Thus, once the pin 39 is rotated to a position firmly retaining the tip 27, the pin 39 is maintained in such rotated position by this ratchet-like arrangement.

Referring further to FIGS. 5 and 8, the block 41 has a protruding lip 77 which supports a resilient member 43 between the block 41 and the back "bridging portion" 79 of the tip 27. Such member 43 may be made of rubber, neoprene, certain plastics or other resilient material which, when compressed in a "tip-retained" position, urges the ridges 63a and grooves 65a of the block 41 against the grooves 65 and ridges 63, respectively, of the head pin 45 so that the pin 39 is prevented from rotating.

Figure 9:
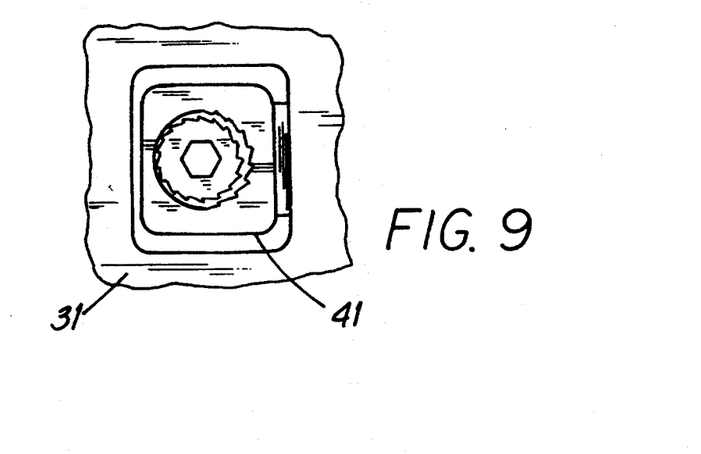
FIG. 9 is a top plan view of the apparatus shown as preliminarily assembled in a tooth tip. Parts are broken away.
Figure 10:
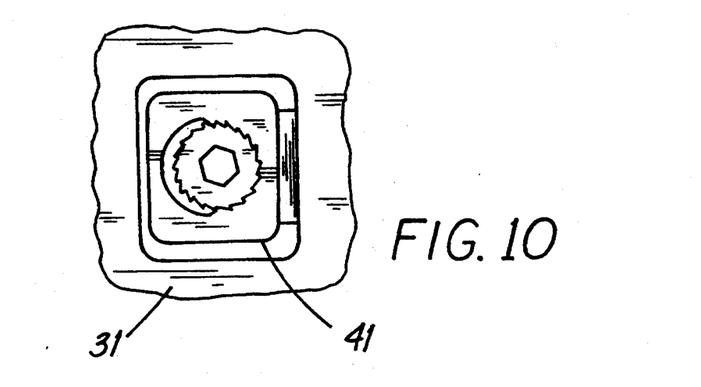
FIG. 10 is a top plan view of the apparatus shown with the pin rotated to an apparatus "lockup" position. Parts are broken away.

Additionally considering FIGS. 9 and 10, when the tip 27 is seated on the nose 29, the lock ring 55 is seated in the groove 57 and the pin 39 extends into the apertures 35 and the hole 37. The block 41 is placed over the head 45 and the resilient member 43 is urged into the space between the block 41 and the portion 79, both as illustrated. When assembled in that way, the arrangement will be generally as shown in FIG. 9.

After the apparatus 10 is so assembled, an Allen wrench is inserted into the pocket 59 and the pin 39 (with its eccentric head 45) rotated to the position shown in FIG. 10. The head 45 urges the block 41 and the resilient member 43 toward the tip bridging portion 79 and compresses the member 43. Such compression helps assure that there is leftward force acting against the block 41 so that the ridges 63, 63a and grooves 65, 65a are maintained in contact with one another.

Figure 11:
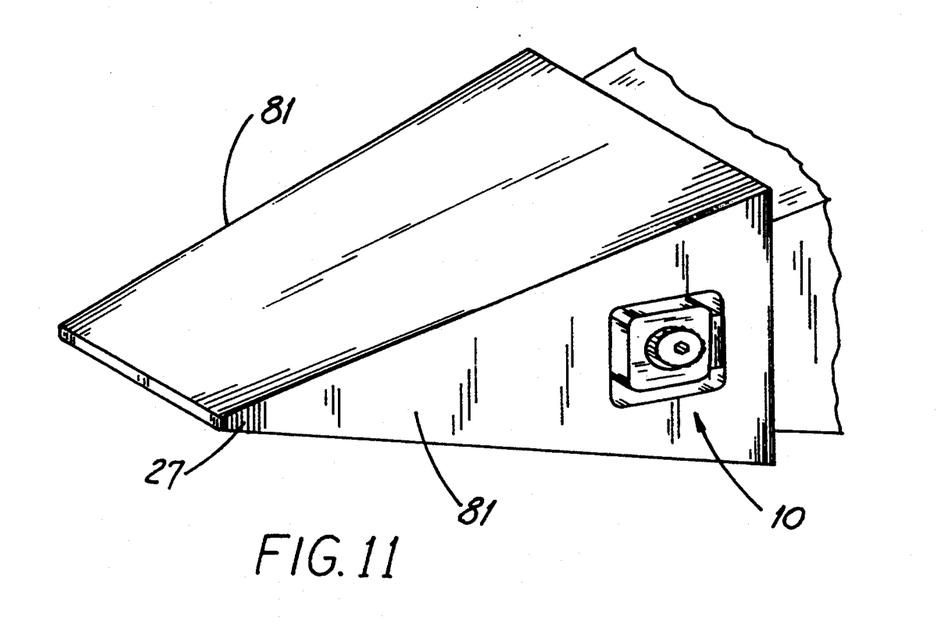
FIG. 11 is a perspective view of another tooth tip and base nose using the apparatus in horizontal orientation.

The variation of FIG. 11 is similar to that of FIG. 4, the primary difference being that the apparatus 10 is between opposed tip side plates 81 rather than between the tip top and bottom plates 31, 33. The operation of such apparatus 10 is the same.

Considering FIG. 5 again, the apparatus 10 is very easy to remove without having access to the bottom of the bucket 21. To remove the apparatus 10, a punch or other driving tool (not shown) is placed against the head 45 and the tool struck from above. The pin 39 is urged downward and out the bottom plate 33, whereupon the tip 27 may be removed from the base nose 29. In the arrangement of FIG. 11, a tool is used to drive the apparatus 10 out sideways.

In the specification, terms such as "top," "bottom", "left" and the like are used. It is to be appreciated that such terms facilitate description of the invention in connection with the drawing and are not limiting.

While the principles of the invention have been disclosed in connection with specific embodiments, it is to be understood clearly that such embodiments are exemplary and not limiting.

What is claimed is:

1. In a digging tooth assembly having a base nose, a replaceable tooth tip mounted on the base nose and a pin securing the tip to the nose, the improvement wherein:

the pin is rotatable;
the pin includes a body portion and a locking head eccentric to the body portion;
a resilient member is between the head and the tooth tip; and
when the pin is rotated to a locking position, the resilient member is compressed by the head to maintain the tip in a nose-contacting position.

2. The assembly of claim 1 wherein:
the pin has a central longitudinal pin axis; and
the locking head has a central longitudinal head axis spaced from the pin axis.

3. The assembly of claim 2 wherein the axes are generally parallel to one another.

4. The assembly of claim 1 wherein:
the locking head is rotatable between a first position and the locking position; and
the head exerts a force toward the tooth tip and the resilient member is compressed between the head and the tooth tip when the head is in the locking position.

5. The assembly of claim 1 further including:
a lock block between the head and the tooth tip, and wherein:
the resilient member is between the lock block and the tooth tip.

6. The assembly of claim 5 wherein:
the pin is mounted for rotation between a first position for assembly and the locking position for tooth tip retention; and
the head includes at least one retention ridge engaging the lock block when the pin is in the locking position.

7. The assembly of claim 6 wherein:
the lock block includes a plurality of retention grooves;
the head includes a plurality of retention ridges; and
each of at least two retention ridges engage separate retention grooves in the lock block.

8. The assembly of claim 1 wherein:
the pin includes a longitudinal central axis in the body portion;
the head extends laterally away from the central axis by a first dimension; and
the body portion extends laterally away from the central axis by a second dimension which is at least about equal to the first dimension.

9. A method involving a digging tooth assembly having (a) a base nose with a hole therethrough, (b) a replaceable tooth tip mounted on the base nose and (c) a pin to be inserted into an opening in the tip for securing the tip to the nose, the method including the steps of:
providing the pin with an eccentric head;
placing a resilient member between the head and the tip;
inserting the pin into the opening; and
rotating the eccentric head, thereby compressing the resilient member between the head and the tooth tip.

10. The method of claim 9 wherein the tooth assembly includes a lock block around the eccentric head and the rotating step includes rotating the head to urge the lock block toward the resilient member.

11. The method of claim 9 wherein the assembly has a top surface and a bottom surface, and the method further includes disassembly steps for removing the tooth tip from the base nose, such disassembly steps including:

driving the pin top-down from the hole in the base nose; and removing the tooth tip from the base nose, thereby disassembling the tooth tip from the digging tooth assembly.

12. The method of claim 9 wherein the rotating step includes rotating the head from a first position to a second position and the method further includes a disassembly step for removing the tooth tip from the base nose, such disassembly step including:

driving the pin from the hole in the base nose when the pin is retained in its second position.

13. In a digging tooth assembly having a base nose, a replaceable tooth tip mounted on the base nose and a pin securing the tip to the nose, the improvement wherein:

the pin includes a locking head rotatable between a first position and a second position;

a resilient member is between the head and the tooth tip; and the head provides a force toward the tooth tip and the resilient member is compressed between the head and the tooth tip when the head is in the second position, whereby the tip is maintained in a nose-contacting position.

14. In a digging tooth assembly having a base nose, a replaceable tooth tip mounted on the base nose and a pin securing the tip to the nose, the improvement wherein:

the pin includes a head and is mounted for rotation between a first position for assembly and a second position for tooth tip retention;

a lock block is between the head and the tooth tip;

a resilient member is between the lock block and the tooth tip;

the head includes at least one retention ridge engaging the lock block when the pin is in the second position; and the resilient member is compressed to maintain the tip in a nose-contacting position.

15. The assembly of claim 14 wherein:

the lock block includes a plurality of retention grooves;

the head includes a plurality of retention ridges; and each of at least two retention ridges engages separate retention grooves in the lock block.

16. A method involving a digging tooth assembly having (a) a base nose with a hole therethrough, (b) a replaceable tooth tip mounted on the base nose and (c) a pin to be inserted into an opening in the tip for securing the tip to the nose, the method including the steps of:

providing the pin with an eccentric locking head;

placing a resilient member between the head and the tip;

placing a lock block around the head;

inserting the pin into the opening;

rotating the eccentric head to urge the lock block toward the resilient member, thereby compressing the resilient member between the head and the tooth tip.

17. A method involving a digging tooth assembly having (a) a base nose with a hole therethrough, (b) a replaceable tooth tip mounted on the base nose and (c) a pin to be inserted into an opening in the tip, the method including steps for securing the tip to the nose and comprising:

providing the pin with an eccentric head;

placing a resilient member between the head and the tip;

inserting the pin into the opening;

rotating the eccentric head from a first position to a second position, thereby compressing the resilient member between the head and the tooth tip, and the method further including a step for removing the tip from the nose and comprising:

driving the pin from the hole in the base nose when the head is in its second position.

* * * * *